United States Patent [19]
Adams, Jr. et al.

[11] Patent Number: 5,652,621
[45] Date of Patent: Jul. 29, 1997

[54] ADAPTIVE COLOR PLANE INTERPOLATION IN SINGLE SENSOR COLOR ELECTRONIC CAMERA

[75] Inventors: James E. Adams, Jr.; John F. Hamilton, Jr., both of Rochester, N.Y.

[73] Assignee: Eastman Kodak Company, Rochester, N.Y.

[21] Appl. No.: 606,112

[22] Filed: Feb. 23, 1996

[51] Int. Cl.$^6$ .................................................. H04N 9/07
[52] U.S. Cl. ........................... 348/272; 348/266; 348/222
[58] Field of Search .................................... 348/222, 231, 348/266, 272, 273, 233; H04N 5/228, 9/07

[56] References Cited

U.S. PATENT DOCUMENTS

| | | | |
|---|---|---|---|
| 3,971,065 | 7/1976 | Bayer . | |
| 4,642,678 | 2/1987 | Cok | 358/44 |
| 5,373,322 | 12/1994 | Laroche | 348/272 |
| 5,382,976 | 1/1995 | Hibbard | 348/266 |
| 5,506,619 | 4/1996 | Adams, Jr. | 348/266 |

*Primary Examiner*—Sherrie Hsia
*Attorney, Agent, or Firm*—Raymond L. Owens

[57] ABSTRACT

Apparatus is described for processing a digitized image signal obtained from an image sensor having color photosites aligned in rows and columns that generate at least three separate color values but only one color value for each photosite location, and a structure for interpolating color values for each photosite location so that it has three different color values. The apparatus includes a memory for storing the digitized image signal and a processor operative with the memory for generating an appropriate color value missing from a photosite location by the interpolation of an additional color value for such photosite locations from color values of different colors than the missing color value at nearby photosite locations. The processor also includes structure for obtaining Laplacian second-order values, gradient values and color difference bias values in at least two image directions from nearby photosites of the same column and row and for adding the Laplacian second-order values, gradient values and color difference bias values to define a classifier and for selecting a preferred orientation for the interpolation of the missing color value based upon a classifier. Finally, a arrangement is provided for interpolating the missing color value from nearby multiple color values selected to agree with the preferred orientation.

19 Claims, 6 Drawing Sheets

ADAPTIVE COLOR PLANE INTERPOLATION IN SINGLE SENSOR COLOR ELECTRONIC CAMERA

CROSS REFERENCE TO RELATED APPLICATIONS

Reference is made to commonly assigned U.S. Ser. Nos. 08/407,436 filed Mar. 17, 1995 (U.S. Pat. No. 5,506,619) to James E. Adams, Jr. and John F. Hamilton, Jr. and 08/407,423 filed Mar. 17, 1995 to John F. Hamilton, Jr. and James E. Adams, Jr. filed concurrently herewith, the teachings of which are incorporated herein.

1. Field of the Invention

This invention relates to the field of electronic imaging and is particularly suitable to electronic still imaging by use of an electronic still camera having a single color sensor and memory.

2. BACKGROUND OF THE INVENTION

In electronic color imaging, it is desirable to simultaneously capture image data in three color planes, usually red, green and blue. When the three color planes are combined, it is possible to create high-quality color images. Capturing these three sets of image data can be done in a number of ways. In electronic photography, this is sometimes accomplished by using a single two dimensional array of sensors that are covered by a pattern of red, green and blue filters. This type of sensor is known as a color filter array or CFA. Below is shown the red (R), green (G) and blue (B) pixels as are commonly arranged on a CFA sensor.

When a color image is captured using a CFA, it is necessary to interpolate the red, green and blue values so that there is an estimate of all three color values for each sensor location. Once the interpolation is done, each picture element, or pixel, has three color values and can be processed by a variety of known image processing techniques depending on the needs of the system. Some examples of the reasons for processing are to do image sharpening, color correction or halftoning.

The following shows how red green and blue pixels can be arranged in a particular color filter array pattern, hereinafter referred to as the Bayer color filter array. For a more detailed description see U.S. Pat. No. 3,971,065 to Bayer.

| G | R | G | R |
|---|---|---|---|
| B | G | B | G |
| G | R | G | R |
| B | G | B | G |

SUMMARY OF THE INVENTION

The object of this invention is to provide an improved apparatus for estimating the missing pixel values in a CFA.

This object is achieved in apparatus for processing a digitized image signal obtained from an image sensor having color photosites aligned in rows and columns that generate at least three separate color values but only one color value for each photosite location, means for interpolating color values for each photosite location so that it has three different color values comprising:

means for storing the digitized image signal;

a processor operative with said storing means for generating an appropriate color value missing from a photosite location by the interpolation of an additional color value for such photosite locations from color values of different colors than the missing color value at nearby photosite locations, said processor including means for obtaining Laplacian second-order values, color difference bias values, and gradient values in at least two image directions from nearby photosites of the same column and row;

means for adding the Laplacian second-order values, the color difference bias values, and the gradient values to define a classifier and for selecting a preferred orientation for the interpolation of the missing color value based upon a classifier; and means for interpolating the missing color value from nearby multiple color values selected to agree with the preferred orientation.

Advantages

The advantages of this invention are 1) is computationally efficient both in execution time and memory storage requirements; and 2) by use of the combination of the Laplacian second-order values, gradient values and color difference bias values to produce a classifier, artifacts (color interpolation) in output image are substantially reduced.

DETAILED DESCRIPTION OF THE INVENTION

Since single-sensor electronic cameras employing color filter arrays are well known, the present description will be directed in particular to elements forming part of, or cooperating more directly with, apparatus and method in accordance with the present invention. Elements not specifically shown or described herein may be selected from those known in the art.

Figure 1:
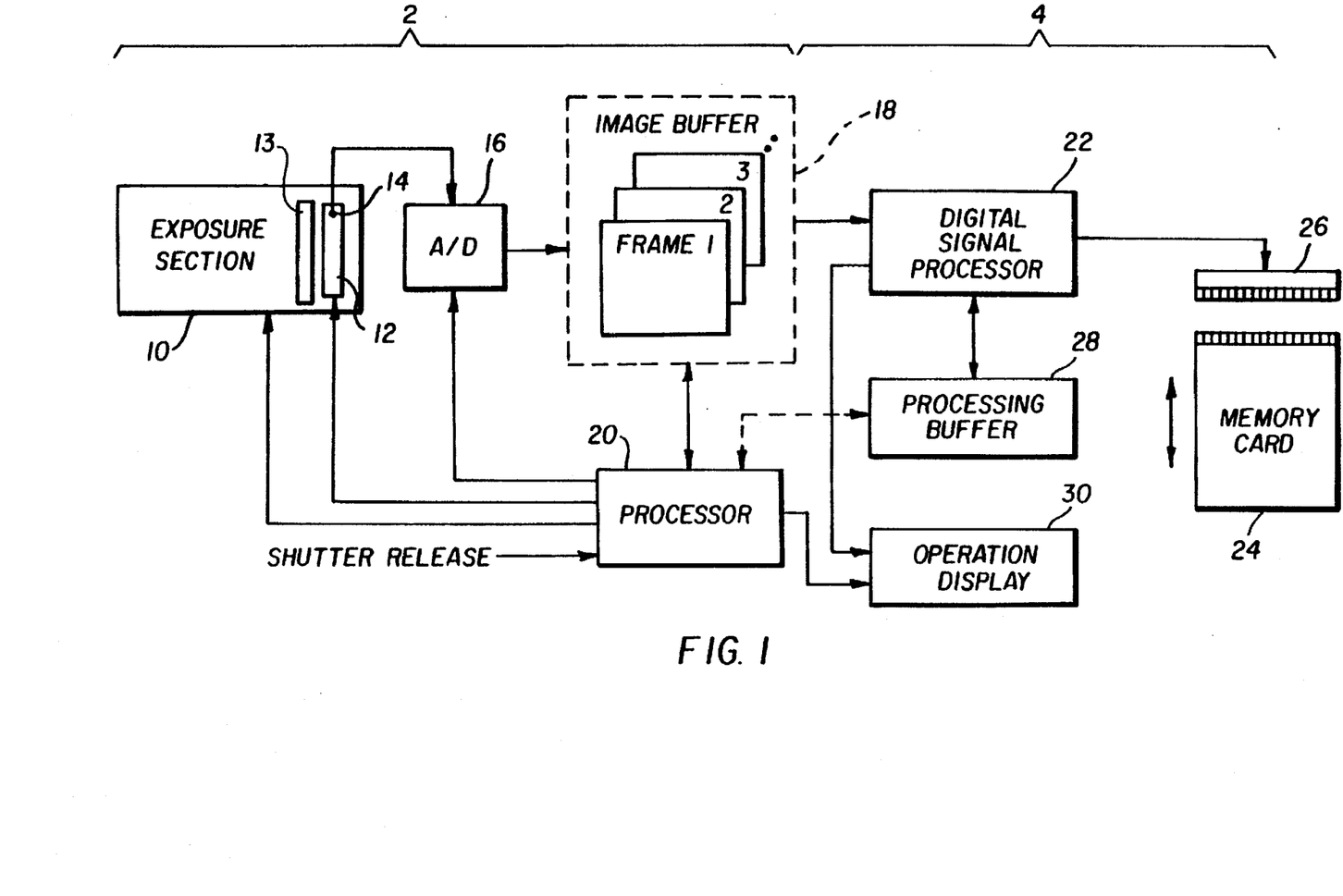
FIG. 1 is a block diagram of an electronic still camera employing interpolation processing according to the invention.
Figure 2:
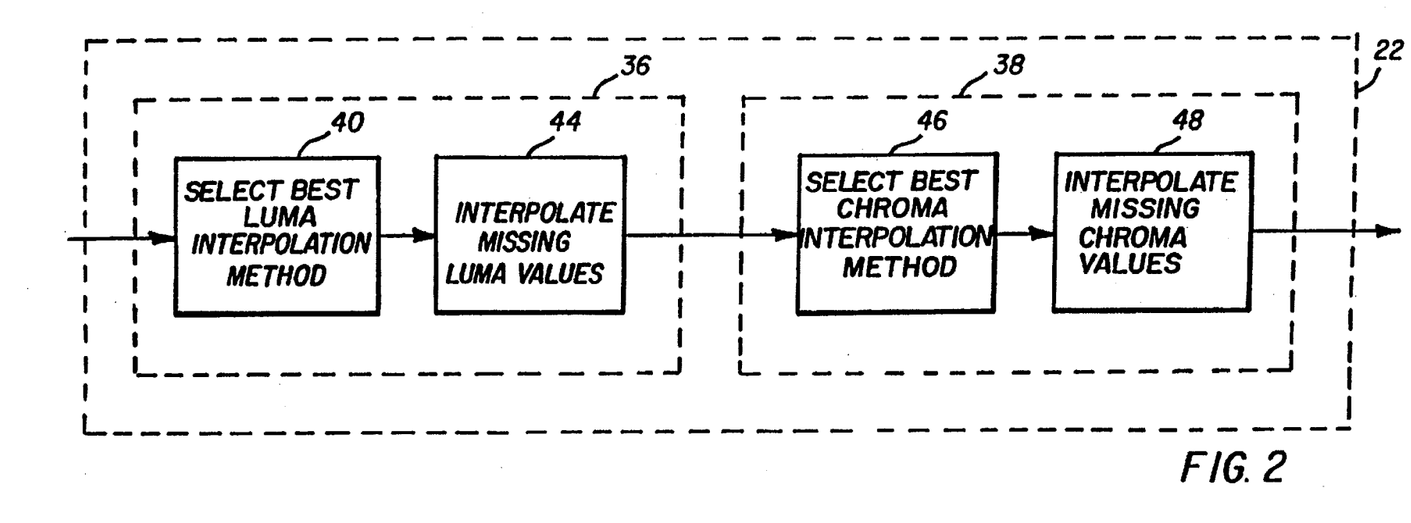
FIG. 2 is a block diagram of the logic of the interpolation processing technique used in connection with the invention.

Referring initially to FIGS. 1 and 2, an electronic still camera is divided generally into an input section 2 and an interpolation and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The image sensor 12, which includes a two-dimensional array of photosites corresponding to picture elements of the image, is a conventional charge-coupled device (CCD) using either well-known interline transfer or frame transfer techniques. The image sensor 12 is covered by a color filter array (CFA) 13, known as the Bayer array, which is described in U.S. Pat. No. 3,971,065 and herewith incorporated by reference. In the Bayer geometry each color covers a photosite, or picture element (pixel), of the sensor. In particular, chrominance colors (red and blue) are interspersed among a checkerboard pattern of luminance colors (green). The image sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signal for each picture element. The digital signals are applied to an image buffer 18, which may be a random access memory (RAM) with storage capacity for a plurality of still images.

A control processor 20 generally controls the input section 2 of the camera by initiating and controlling exposure (by operation by the diaphragm and shutter (not shown) in the exposure section 10), by generating the horizontal and vertical clocks needed for driving the image sensor 12 and for clocking image information therefrom, and by enabling the A/D converter 16 in conjunction with the image buffer 18 for each signal segment relating to a picture element. (The control processor 20 would ordinarily include a microprocessor coupled with a system timing circuit.) Once a certain number of digital image signals have been accumulated in the image buffer 18, the stored signals are applied to a digital signal processor 22, which controls the throughput processing rate for the interpolation and recording section 4 of the camera. The digital signal processor 22 applies an interpolation algorithm to the digital image signals, and sends the interpolated signals to a conventional, removable memory card 24 via a connector 26.

Since the interpolation and related processing ordinarily occurs over several steps, the intermediate products of the processing algorithm are stored in a processing buffer 28. (The processing buffer 28 may also be configured as part of the memory space of the image buffer 18.) The number of image signals needed in the image buffer 18 before digital processing can begin depends on the type of processing, that is, for a neighborhood interpolation to begin, a block of signals including at least a portion of the image signals comprising a video frame must be available. Consequently, in most circumstances, the interpolation may commence as soon as the requisite block of picture elements is present in the buffer 18.

The input section 2 operates at a rate commensurate with normal operation of the camera while interpolation, which may consume more time, can be relatively divorced from the input rate. The exposure section 10 exposes the image sensor 12 to image light for a time period dependent upon exposure requirements, for example, a time period between 1/1000 second and several seconds. The image charge is then swept from the photosites in the image sensor 12, converted to a digital format, and written into the image buffer 18. The driving signals provided by the control processor 20 to the image sensor 12, the A/D converter 16 and the buffer 18 are accordingly generated to achieve such a transfer. The processing throughput rate of the interpolation and recording section 4 is determined by the speed of the digital signal processor 22.

One desirable consequence of this architecture is that the processing algorithm employed in the interpolation and recording section may be selected for quality treatment of the image rather than for throughput speed. This, of course, can put a delay between consecutive pictures which may affect the user, depending on the time between photographic events. This is a problem since it is well known and understood in the field of electronic imaging that a digital still camera should provide a continuous shooting capability for a successive sequence of images. For this reason, the image buffer 18 shown in FIG. 1 provides for storage of a plurality of images, in effect allowing a series of images to "stack up" at video rates. The size of the buffer is established to hold enough consecutive images to cover most picture-taking situations.

An operation display panel 30 is connected to the control processor 20 for displaying information useful in operation of the camera. Such information might include typical photographic data, such as shutter speed, aperture, exposure bias, color balance (auto, tungsten, fluorescent, daylight), field/frame, low battery, low light, exposure modes (aperture preferred, shutter preferred), and so on. Moreover, other information unique to this type of camera is displayed. For instance, the removable memory card 24 would ordinarily include a directory signifying the beginning and ending of each stored image. This would show on the display panel 30 as either (or both) the number of images stored or the number of image spaces remaining, or estimated to be remaining.

The digital signal processor 22 interpolates each still video image stored in the image buffer 18 according to the interpolation technique shown in FIG. 2. The interpolation of missing data values at each pixel location follows the sequence shown in FIG. 2; that is, first, the high frequency information for the "missing green" pixels (i.e., the red and blue pixel locations) are interpolated to improve the luminance rendition and, secondly, the color difference information is interpolated at the high frequency locations by bilinear methods to generate the other colors of the CFA pattern. In the implementation shown in FIG. 2, an adaptive interpolation technique is used in the luminance section 36 for optimizing the performance of the system for images with horizontal and vertical edges. "Missing green" pixels are adaptively interpolated either horizontally, vertically or two-dimensionally depending upon the gradients, Laplacian second-order values and color difference bias values established from the neighboring pixel locations in the vertical and horizontal directions around the "missing green" pixel.

The first step for adaptively interpolating the "missing green" pixels is to select an interpolation method. The details of this process are shown in block 40 of FIG. 3. The process starts by computing two composite pixel classifier values in block 50, one for the horizontal direction and one for the vertical. The term "pixel classifier" denotes a value computed for the purpose of making a decision about further processing of the pixel information. The term "composite" denotes the dependency of the value on a multiplicity of color planes. In this case, twice the absolute value of the gradient of the green plane is added to the absolute value of the Laplacian second-order value of the red or blue plane, depending on which was the corresponding color in the Bayer color filter array, and the absolute value of the color difference bias value, which uses both green plane and, depending on which was the corresponding color in the Bayer color filter array, red or blue plane values.

Figure 3:
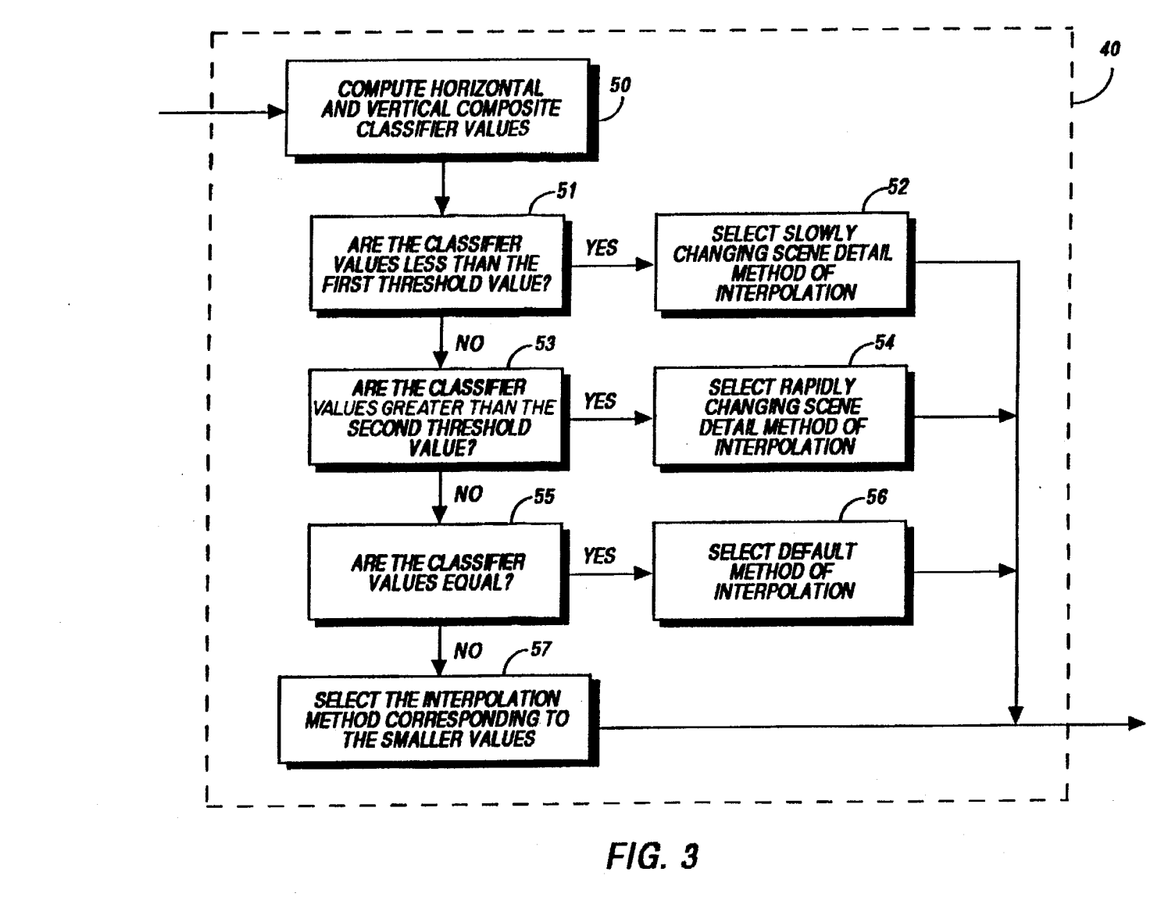
FIG. 3 is a detailed block diagram of the logic of the interpolation luminance section in FIG. 2.

The two classifier values are compared in block 51 versus a predetermined value hereinafter referred to as "the first threshold value". If both classifier values are less than the first threshold value, then the interpolation method corresponding to slowly changing scene detail is selected in block 52. "Slowly changing scene detail" means both horizontal direction classifier value and vertical direction classifier value are less than the first threshold value. If at least one of the classifier values is greater than or equal to the first threshold value, both classifier values are compared in block 53 to a predetermined value hereinafter referred to as "the second threshold value". If both classifier values are greater than the second threshold value, then the interpolation method corresponding to rapidly changing scene detail is selected in block 54. "Rapidly changing scene detail" means both horizontal direction classifier value and vertical direction classifier value are greater than the second threshold value. If at least one of the classifier values is less than or equal to the second threshold value, then the classifier values are compared in block 55 to each other. In the likely event that one of the classifier values is less than the other classifier value, the interpolation method corresponding to the smaller classifier value in block 57 is chosen. If both classifier values are equal in value, then the default interpolation method in block 56 is chosen. At this point block 40 is complete.

Figure 4:
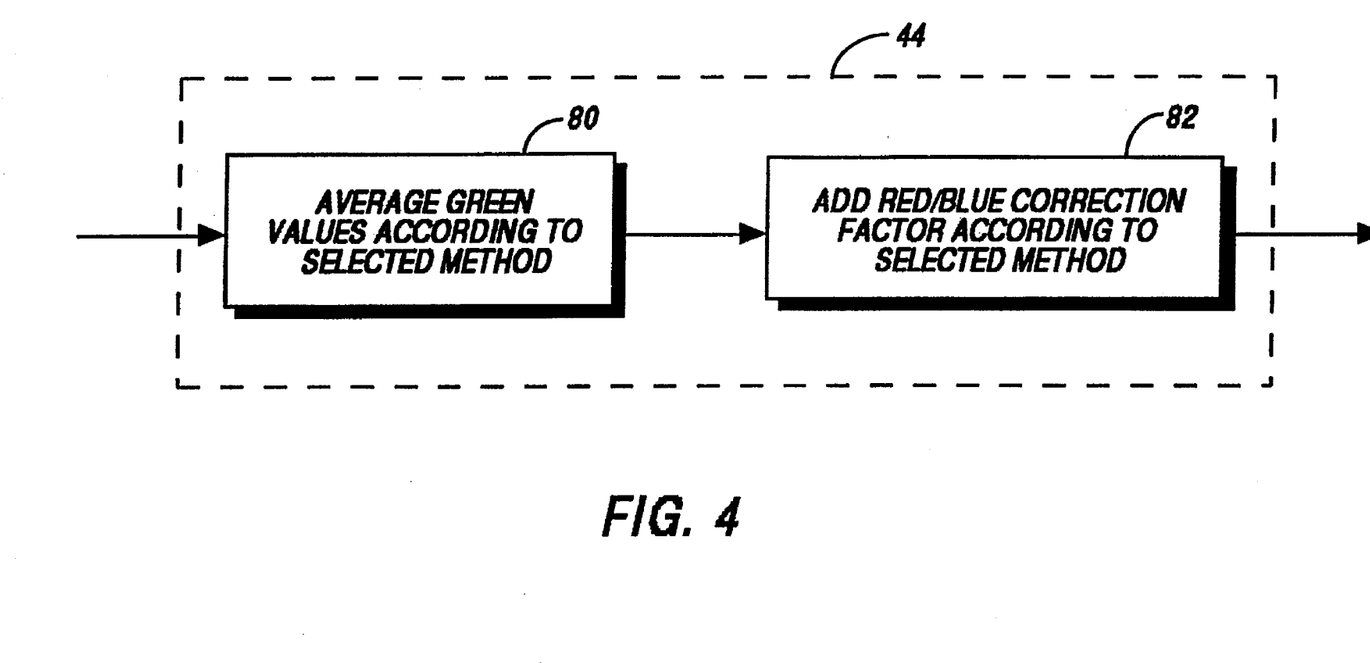
FIG. 4 is a more detailed block diagram of the logic of the chrominance section in FIG. 2.

The green (luma) interpolation step in block 44 has two parts, as shown in FIG. 4. The first part in block 80 averages the two luminance (green) values according to the selected interpolation method. The second part in block 82 adds a correction factor based on either red or blue neighboring values depending on if the pixel in question was covered by a red or blue filter in the Bayer color filter array and the interpolation method selected by block 40.

The red/blue (chroma) interpolation proceeds in a manner similar to the green (luma) interpolation described above. The details of this process are shown in Block 46 of FIG. 5. The process starts by determining if the two horizontally adjacent pixels to the pixel with the "missing" chroma value in question (either red or blue) are of the same color as the missing chroma value in block 60. If the two horizontally adjacent pixel values are the correct color, then the horizontal interpolation method in block 61 is used. If the two vertically adjacent pixels are of the same color as the "missing" chroma value in block 62, then the vertical interpolation method in block 63 is chosen. If neither horizontal or vertical interpolation methods have been chosen, then compute two composite pixel classifier values in block 64, one for the negative diagonal direction and one for the positive diagonal. The term "negative diagonal" denotes the line of slope $-1$ (connecting the upper left to the lower right). The term "positive diagonal" denotes the line of slope $+1$ (connecting the lower left to the upper right). Again, these composite classifiers are found by adding the absolute value of the Laplacian second-order value of the green plane to the absolute value of the gradient of either the red or blue plane, depending on which color is being interpolated.

Figure 5:
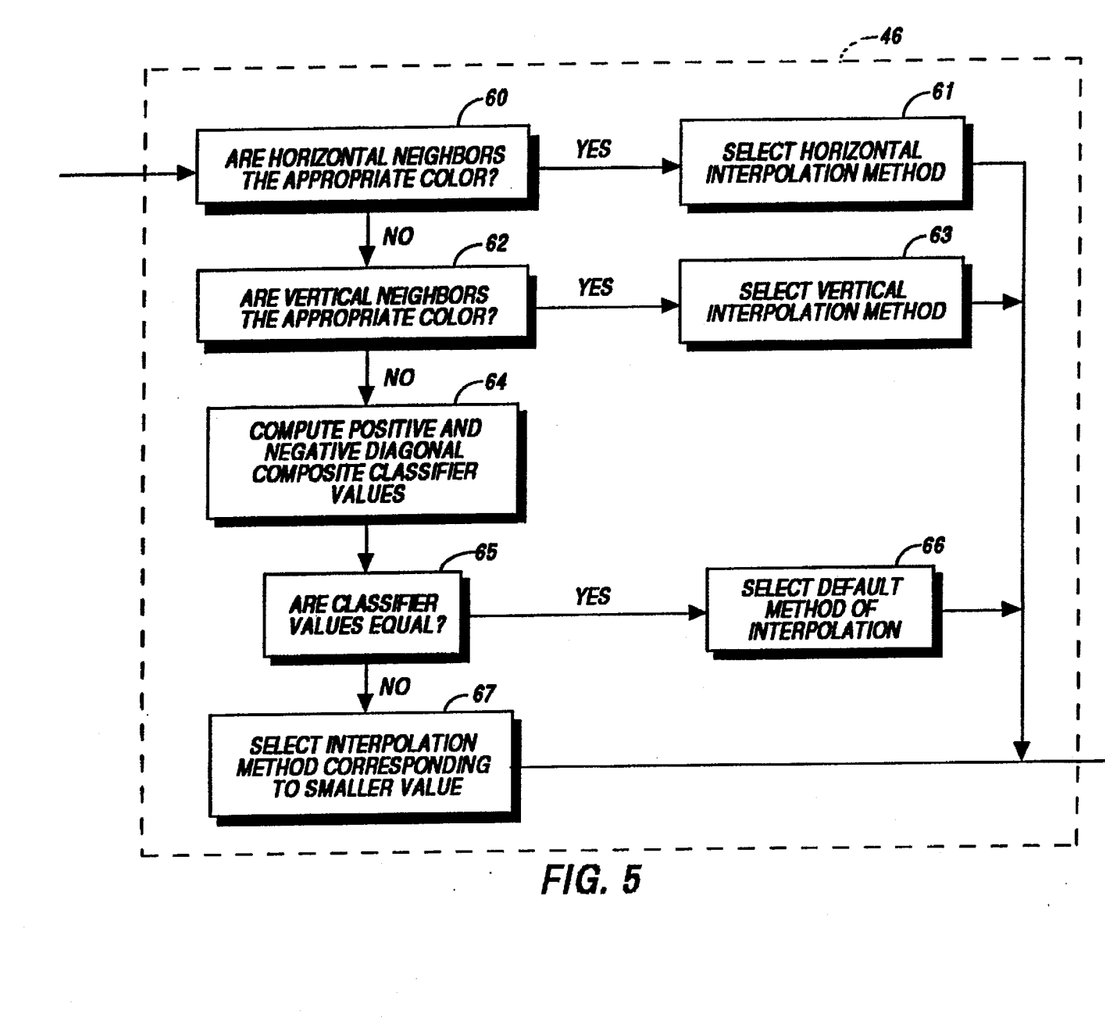
FIGS. 5 and 6 show logic block diagrams for the interpolation processes in accordance with the invention.

The two classifier values are then compared in block 65 and tested for equality. In the likely event that one value is smaller than the other, the interpolation method corresponding to the smaller value is selected in block 67. If the values are equal, then the default interpolation method is selected in block 66. At this point Block 46 is done.

Figure 6:
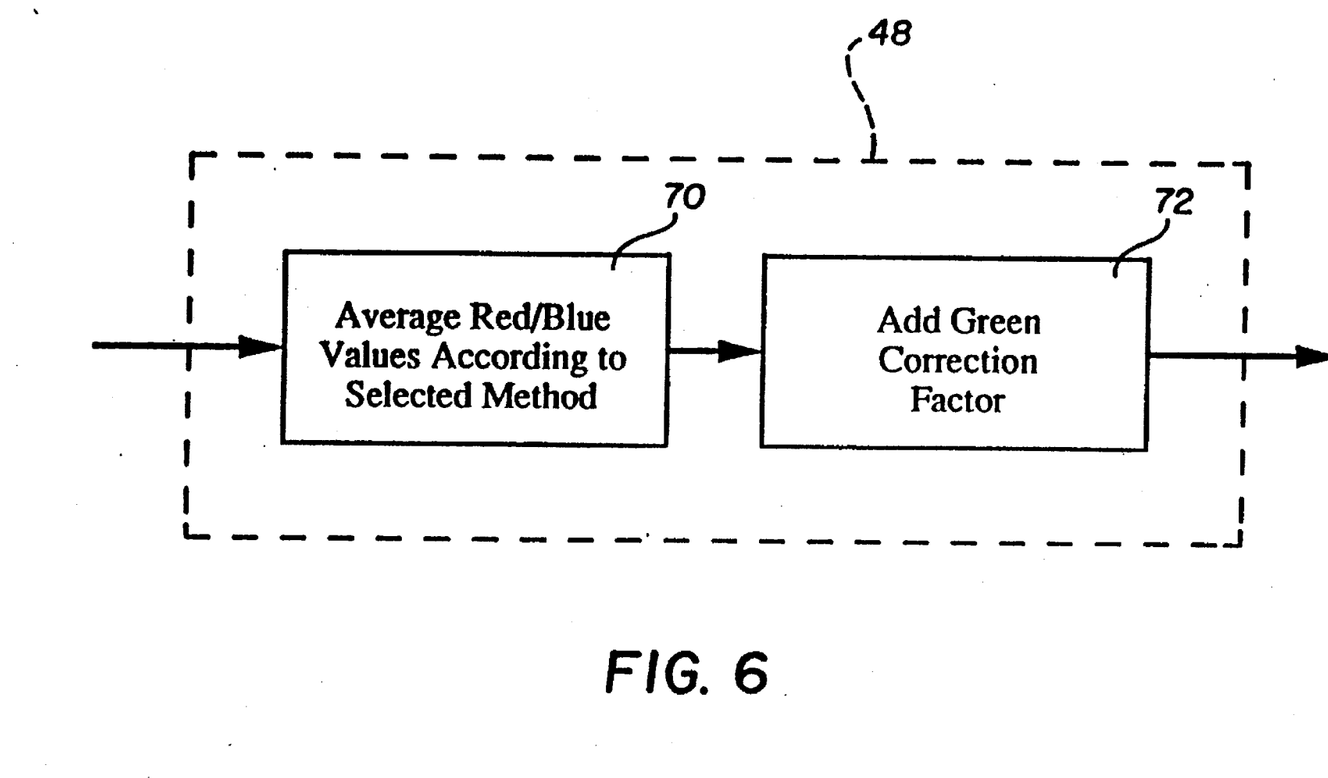

The red/blue (chroma) interpolation step in block 48 has two parts, as shown in FIG. 6. In the first part in block 70 two chrominance values, either red or blue depending on the pixel's position in the Bayer color filter array, are averaged according to the selected interpolation method. The second part in block 72 adds a correction factor based on green neighboring values.

More specifically, the following is a detailed description of the operation of the digital signal processor for a specific example using the Bayer array.

Green Plane Interpolation

The first pass of the interpolation fully populates the green color plane. The Bayer color filter array is assumed. Consider the following pixel neighborhood.

Gx is a green pixel and Ax is either a red pixel or a blue pixel. (All Ax pixels will be the same color for the entire neighborhood.) For simplicity, we will use the term "chroma" to mean either red or blue. We form the following classifiers.

$$h = |-A3+2A5-A7|+2|G4-G6|+|-G4+2(A5+bh)-G6|$$

$$v = |-A1+2A5-A9|+2\cdot|G2-G8|+|-G2+2(A5+bv)-G8|$$

where $$bh = (bh'+A3-G3')/2$$

$$bv = (bv'+A1-G1')/2$$

where bh' is the previous value of bh along the same row, bv' is the previous value of bv along the same column and G1' and G3' are previously predicted green values. Both bh and bv are initialized to zero at the beginning of the row/column. (Note that as the algorithm is usually implemented to process the image row by row, bh can be a simple variable and bv is a one-dimensional array with an entry for each column). Note that Ax is either Rx or Bx. (All Ax's will be the same color).

These classifiers are composed of Laplacian second-order values for the chroma data, gradient values for the green data and color difference bias values that use both chroma and green data. For example, for the classifier h, $-A3+2A5-A7$ is a Laplacian second-order value, $G4-G6$ is a green gradient value and $-G4+2(A5+bh)-G6$ is a color difference bias value. As such, these classifiers are sensing the high spatial frequency information present in the pixel neighborhood in the horizontal (h) and vertical (v) directions.

We then form four predictors.

$$A = (G2+G4+G6+G8)/4$$

$$F = (G2+G4+G6+G8)/4+(-A1-A3+4A5-A7-A9)/12$$

$$H = (G4+G6)/2+(-A3+2A5-A7)/4$$

$$V = (G2+G8)/2+(-A1+2A5-A9)/4$$

These predictors are composed of arithmetic averages for the green data and, in the case of F, H and V, appropriately scaled Laplacian second-order values for the chroma data. Predictor A is to be used when both horizontal and vertical classifier values are less than the first threshold value, T1. T1 is chosen to reduce noise in the image reconstruction in regions of slowly changing scene detail. An appropriate value for T1 is 25 when the green pixel values and chroma pixel values range from 0 to 255. Predictor F is used when both horizontal and vertical classifier values are greater than the second threshold value, T2. T2 is chosen to reduce noise in the image reconstruction in regions of rapidly changing scene detail. An appropriate value for T2 is 200 when the green pixel values and chroma pixel values range from 0 to 255. Predictor H is to be used when the preferred orientation for the interpolation is in the horizontal direction within the pixel neighborhood. Similarly, predictor V is to be used when the preferred orientation for the interpolation is the vertical direction.

The complete green interpolation process may now be expressed as below.

```
if (h < T1 and v < T1)
    G5 = A
else if (h > T2 and v > T2)
    G5 = F
else if (h < v)
    G5 = H
else
    G5 = V
```

The key to this process is that both the green and the chroma data must indicate a minimum of high spatial frequency information for a given orientation to be chosen as the preferred orientation for the interpolation. If there is a large mount of high spatial frequency information in either the green data or chroma data for a given orientation, it will inflate the value of the corresponding classifier. This, in turn, reduces the likelihood for that orientation to be chosen as the preferred orientation for the interpolation.

Green Pixel Value Averaging

Ater the green plane reconstruction, additional smoothing on the original green pixel values can be performed to promote further noise reduction. Consider the following post green plane reconstruction neighborhood:

| G1  | G2' | G3  |
|-----|-----|-----|
| G4' | G5  | G6' |
| G7  | G8' | G9  | where Gx is an original green pixel value and Gx' is a predicted green pixel value. If two or more of the Gx' values were interpolated using the method corresponding to slowly changing scene detail, then Gx is replaced with the following value, G5":

$$G5"=(G2'+G4'+G6'+G8')/4$$

One embodiment of this idea is to use G5" when two or more values of Gx' were predicted using predictor A. This need not be, however, as any method of interpolation appropriate to slowly changing scene detail could be used in place of predictor A. (Note that if all four predicted values were derived using predictor A, then G5" becomes, equivalently:

$$G7"=(G1+2G2+2G4+G5+4G7+G9+2G10+2G12+G13)/16$$

where the indices refer to the expanded pixel neighborhood below:

```
            G1
      G2   G3'  G4
G5  G6'  G7   G8'  G9
      G10  G11' G12
            G13
```

In effect, G7" is a center weighted average.)

Red and Blue (Chroma) Interpolation

The second pass of the interpolation fully populates the red and blue color planes. In U.S. Pat. No. 4,642,678, issued Feb. 10, 1987, Cok (the disclosure of which is incorporated by reference herein) disclosed the chroma interpolation summarized below. Consider the following neighborhood.

| A1 | G2 | A3 |
|----|----|----|
| G4 | C5 | G6 |
| A7 | G8 | A9 |

Gx is a green pixel, Ax is either a red or blue pixel and C5 is the opposite color pixel to Ax (i.e., if Ax is red then C5 is blue and visa versa). Note that all Gx pixels, G1 through G9, are assumed to be known and coincident with all corresponding Ax and C5 pixels.

There are three cases. Case 1 is when the nearest same colored neighbors to Ax are in the same column. The following predictor is used. (A4 is used as an example.)

$$A4=(A1+A7)/2+(-G1+2G4-G7)/2$$

Case 2 is when the nearest same colored neighbors to Ax are in the same row. The following predictor is used. (A2 is used as an example.)

$$A2=(A1+A3)/2+(-G1+2G2-G3)/2$$

Case 3 is when the nearest same colored neighbors to Ax are at the four corners. The following predictor is used. (A5 is used as an example.)

$$A5=(A1+A3+A7+A9)/4+(-G1-G3+4G5-G7-G9)/4$$

We describe an improvement for case 3. We form the following two classifiers.

$$DN=|-G1+2G5-G9|+|A1-A9|$$

$$DP=|-G3+2G5-G7|+|A3-A7|$$

These classifiers are composed of Laplacian second-order values for the green data and gradient values for the chroma data. As such, these classifiers are sensing the high spatial frequency information present in the pixel neighborhood in the negative diagonal (DN) and positive diagonal (DP) directions.

We then form three predictors.

$$A5N=(A1+A9)/2+(-G1+2G5-G9)/2$$

$$A5P=(A3+A7)/2+(-G3+2G5-G7)/2$$

$$A5A=(A1+A3+A7+A9)/4+(-G1-G3+4G5-G7-G9)/4$$

These predictors are composed of arithmetic averages for the chroma data and appropriately scaled Laplacian second-order values for the green data. A5N is to be used when the preferred orientation for the interpolation is in the negative diagonal direction within the pixel neighborhood. Similarly, A5P is to be used when the preferred orientation for the interpolation is the positive diagonal direction. A5A is used when there is no clear preference for orientation for the interpolation.

The complete case 3 chrome interpolation process may now be expressed as below.

```
if (DN < DP)
    A5 = A5N
else if (DP < DN)
    A5 = A5P
else
    A5 = A5A
```

In this process both the green and the chroma data must indicate a minimum of high spatial frequency information for a given orientation to be chosen as the preferred orientation for the interpolation. If there is a large amount of high spatial frequency information in either the green data or chroma data for a given orientation, it will inflate the value of the corresponding classifier value. This, in turn, reduces the likelihood for that orientation to be chosen as the preferred orientation for the interpolation.

In practice, the case 3 chroma interpolation process may be simplified, as below, for computational efficiency.

```
if (DN <= DP)
    A5 = A5N
else
    A5 = A5P
```

This simplification is achieved by defining the negative diagonal direction as the default preferred orientation for the interpolation when both negative and positive diagonal classifiers are equal. The number of occurrences in a typical image when the negative and positive diagonal classifiers are equal is so small that this simplification generally has negligible impact on the image quality of the final reconstructed image.

The invention has been described in detail with particular reference to certain preferred embodiments thereof, but it will be understood that variations and modifications can be effected within the spirit and scope of the invention.

PARTS LIST
2 input section
4 recording section
10 exposure section
12 image sensor
13 color filter array
14 output diode
16 A/D converter
18 image buffer
20 control processor
22 digital signal processor
24 removable memory card
26 connector
28 processing buffer
30 display panel
36 luminance section
38 chroma section
40 select best luma interpolation
44 interpolate missing luma values
46 select best chroma interpolation
48 interpolate missing chroma values
50 compute horizontal and vertical composite classifier values
51 classifier threshold #1 test
52 select slowly changing scene detail method of interpolation
53 classifier threshold #2 test
54 select rapidly changing scene detail method of interpolation
55 classifier equality test
56 select default method for interpolation
57 select the interpolation method corresponding to the smaller value
60 horizontal neighboring pixel test
61 select horizontal interpolation method
62 vertical neighboring pixel test
63 select vertical interpolation method
64 compute positive and negative composite classifier values
65 classifier equality test
66 select default method for interpolation
67 select interpolation method corresponding to the smaller value
70 average red/blue values
72 add green correction factor
80 average green value
82 add red/blue correction factors

We claim:

1. In apparatus for processing a digitized image signal obtained from an image sensor having color photosites aligned in rows and columns the image sensor generating at least three separate color values but only one color value for each photosite location, the apparatus including means for interpolating the color values for each photosite location so that each photosite has the three separate color values comprising:

means for storing the digitized image signal;
   processor means operative with said storing means for generating an appropriate color value missing from a photosite location by the interpolation of an additional color value for such photosite locations from color values of different colors than the missing color value at nearby photosite locations, said processor including
   means for obtaining Laplacian second-order values, color difference bias values, and gradient values in at least two image directions from nearby photosites of the same column and row;
   means for adding the Laplacian second-order values, the color difference bias values, and the gradient values to define a classifier and for selecting a preferred orientation for the interpolation of the missing color value based upon the classifier; and
   means for interpolating the missing color value from nearby multiple color values selected to agree with the preferred orientation.

2. The apparatus of claim 1 wherein, when the preferred orientation is horizontal, a color value is red, and the missing color value is green, adjacent horizontal green color values are averaged and horizontal red color values including the red color value provide a correction value.

3. The apparatus of claim 1 wherein, when the preferred orientation is horizontal, a color value is blue, and the missing color value is green, adjacent horizontal green color values are averaged and horizontal blue color values including the blue color value provide a correction value.

4. The apparatus of claim 1 wherein, the classifier include a horizontal classifier value and a vertical classifier value and when the horizontal classifier value and the vertical classifier value are both less than a predetermined value, and the missing color value is green, adjacent horizontal and vertical green color values are averaged to provide a correction value.

5. The apparatus of claim 1 wherein, the classifier include a horizontal classifier value and a vertical classifier value and when the horizontal classifier value and the vertical classifier value are both greater than a predetermined value, a color site is red, and the missing color value is green, adjacent horizontal and vertical green color values are averaged and horizontal and vertical red color values including a red color site value provide a correction value.

6. The apparatus of claim 1 wherein, the classifier include a horizontal classifier value and a vertical classifier value and when the horizontal classifier value and the vertical classifier value are both greater than a predetermined value, a color site is blue, and the missing color value is green, adjacent horizontal and vertical green color values are averaged and horizontal and vertical blue color values including a blue color site value provide a correction value.

7. The apparatus of claim 1 wherein, when the preferred orientation is horizontal, a color value is green, and the missing color value is red, adjacent horizontal red color values are averaged and horizontal green color values including the green color value provide a correction value.

8. The apparatus of claim 1 wherein, when the preferred orientation is horizontal, a color value is green, and the missing color value is blue, adjacent horizontal blue color values are averaged and horizontal green color values including the green color value provide a correction value.

9. The apparatus of claim 1 wherein, when the preferred orientation is negative diagonal, a color value is green, and the missing color value is red, adjacent negative diagonal red color values are averaged and negative diagonal green color values including the green color site value provide a correction value.

10. The apparatus of claim 1 wherein, when the preferred orientation is negative diagonal, a color value is green, and the missing color value is blue, adjacent negative diagonal blue color values are averaged and negative diagonal green color values including the green color site value provide a correction value.

11. The apparatus of claim 1 wherein, when the preferred orientation is vertical, a color value is red, and the missing color value is green, adjacent vertical green color values are averaged and vertical red color values including the red color site value provide a correction value.

12. The apparatus of claim 1 wherein, when the preferred orientation is vertical, a color value is blue, and the missing color value is green, adjacent vertical green color values are averaged and vertical blue color values including the blue color site value provide a correction value.

13. The apparatus of claim 1 wherein, when the preferred orientation is vertical, a color value is green, and the missing color value is red, adjacent vertical red color values are averaged and vertical green color values including the green color site value provide a correction value.

14. The apparatus of claim 1 wherein, when the preferred orientation is vertical, a color value is green, and the missing color value is blue, adjacent vertical blue color values are averaged and vertical green color values including the green color site value provide a correction value.

15. The apparatus of claim 1 wherein, when the preferred orientation is positive diagonal, a color value is green, and the missing color value is red, adjacent positive diagonal red color values are averaged and positive diagonal green color values including the green color site value provide a correction value.

16. The apparatus of claim 1 wherein, when the preferred orientation is positive diagonal, a color value is green, and the missing color value is blue, adjacent positive diagonal blue color values are averaged and positive diagonal green color values including the green color value provide a correction value.

17. The apparatus of claim 4 wherein the predetermined value is 25 when red, green and blue pixel values are represented by a digital range corresponding from 0 to 255.

18. The apparatus of claim 5 wherein the predetermined value is 200 when red, green and blue pixel values are represented by a digital range corresponding from 0 to 255.

19. The apparatus of claim 6 wherein the predetermined value is 200 when red, green and blue pixel values are represented by a digital range corresponding from 0 to 255.

* * * * *

UNITED STATES PATENT AND TRADEMARK OFFICE
CERTIFICATE OF CORRECTION

PATENT NO. : 5,652,621
DATED : July 29, 1997
INVENTOR(S) : James E. Adams, Jr., et. al.

It is certified that error appears in the above-identified patent and that said Letters Patent is hereby corrected as shown below:

Column 11, line 5     Delete "site"
Column 11, line 11    Delete "site"
Column 11, line 17    Delete "site"
Column 11, line 22    Delete "site"
Column 11, line 27    Delete "site"
Column 12, line 5     Delete "site"
Column 12, line 9     Delete "site"

Signed and Sealed this

Sixteenth Day of December, 1997

*Attest:*

BRUCE LEHMAN

*Attesting Officer*     *Commissioner of Patents and Trademarks*